United States Patent
Wu

(10) Patent No.: US 6,724,352 B1
(45) Date of Patent: Apr. 20, 2004

(54) APPARATUS FOR CONTROLLING LCD SHUTTER GLASSES

(75) Inventor: Chih-Peng Wu, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 09/417,407

(22) Filed: Oct. 13, 1999

(30) Foreign Application Priority Data

Mar. 16, 1999 (TW) ........................................ 88104012 A

(51) Int. Cl.[7] .................................................. G09G 5/00
(52) U.S. Cl. ................... 345/8; 345/7; 348/56
(58) Field of Search ........................ 345/7, 8, 87, 419; 340/56

(56) References Cited

U.S. PATENT DOCUMENTS

| | | |
|---|---|---|
| 5,796,373 A | 8/1998 | Ming-Yen |
| 5,808,588 A | 9/1998 | Lin |
| 5,821,989 A * | 10/1998 | Lazzaro et al. ............... 348/56 |

\* cited by examiner

*Primary Examiner*—Matthew Luu
(74) *Attorney, Agent, or Firm*—Coudert Brothers LLP

(57) ABSTRACT

An apparatus for controlling liquid-crystal-display (LCD) shutter glasses for making the right and left LCD-type shutter of the LCD shutter glasses transparent alternately. An observer who wears the LCD shutter glasses controlled by the apparatus will experience the three-dimensional effect if the alternately transparent speed of the right and left LCD-type shutter is matched with the vertical synchronization signal. The apparatus for controlling liquid-crystal-display (LCD) shutter glasses comprises a first means, a second means, and a third means. The first means is responsive to a vertical synchronization signal and generates a light-passing enable signal. The second means could generate a first voltage signal. The third means is responsive to the light-passing enable signal and the first voltage signal to generate a first and a second controlling signals to control the left and the right LCD-type shutters such that a three dimension image effect is observed by the observer.

4 Claims, 6 Drawing Sheets

APPARATUS FOR CONTROLLING LCD SHUTTER GLASSES

BACKGROUND OF INVENTION

1. Field of Invention

The present invention relates to an apparatus for controlling liquid-crystal-display (LCD) shutter glasses and, more particularly, to an apparatus capable of alternately making the right and left LCD-type shutter of the LCD shutter glasses transparent. An observer who wears the LCD shutter glasses controlled by said controlling apparatus will feel the three-dimension effect if the alternately transparent speed of the right and left LCD-type shutter is matched with the vertical synchronization signal.

2. Description of Prior Art

In keeping with the improvement of computer technology, the computer software industry has also shown incredible advances through the aid of high-speed computer hardware. For example, computer software combining three-dimensional pictures with stereo-sound has bloomed, whereas two-dimensional pictures were combined with mono-sound in the past. More particularly, it is popular for an observer to enjoy the truly three-dimensional pictures or images by wearing a pair of LCD shutter glasses including a right and a left LCD-type shutters.

In order to produce the three-dimensional effect for consumers, the linear perspective method or the binocular disparity method is usually adopted to induce depth perception, then the vision nerves will produce the three-dimensional effect by the depth perception. The said linear perspective method utilizes the length and difference of several lines to express the three-dimensional effect, as shown in FIG. 1. FIG. 1 illustrates the frontal view of a pair of parallel tracks by the linear perspective method. The terminals of the tracks far away from the observer will be merged together from the view of observer. On the other hand, the distance between two tracks will increase if the tracks are closer to the observer. That is, for the purpose of producing three-dimensional effect by the linear perspective method, the distance between two parallel lines should be decreased if the those lines are far away from the observer, and the distance between two parallel lines should be increased if those lines are close to the observer. Many computer software programs usually adopt the linear perspective method to produce three-dimensional pictures, but those three-dimensional pictures drawn by this method are not truly "three-dimensional". Those pictures are different from three-dimensional objects of the real world and could only be shown in the two-dimension plane, such as screens or displays.

The other method of producing the three-dimensional effect is the binocular disparity method. When the observer looks at an object of the real world, the image forming on the retina of the left eye and the image forming on the retina of right eye are different from each other because the different lines of vision. The farther the distance between the object and the observer, the greater the difference between those two images. According to the above-mentioned description, if the image forming on the retina of the left eye and the image forming on the retina of right eye are different from each other, a truly "three-dimensional" picture could be created because of the depth perception. The prior art of "computerized stereoscopic image system and method of using two-dimensional image for providing a view having visual depth" issued by U.S. Pat. No. 5,796,373 utilizes one pair of LCD shutter glasses and the binocular disparity method to produce a three-dimensional effect. In that prior art, the alternately transparent rate of the right and left LCD-type shutters is synchronal with the alternate emerging rate of the right and left images shown in the computer screen. That is, when the left image for the left eye is shown on the screen, the left LCD-type shutter is transparent and the right one is opaque. On the other hand, when the right image for the right eye is shown on the screen, the right LCD-type shutter is transparent and the left one is opaque. If the alternate emerging rate of the left and right images is less than the delay time of the vision, a truly three-dimensional picture will be created.

In that prior art, the 3-D image system comprises a controlling device, as shown in FIG. 2(a). The controlling device mainly comprises a power means, a VGA interface buffer, a shutter switch means, a shutter controlling means, and a output means. There are several drawbacks in the controlling device. First, because the controlling device is separate from the computer, it can not use the power supply of the computer and must have the power means to offer the electric power. The function of the power means is to transduce the external AC power into the DC power in order to provide the stable electric power for the other circuits of the controlling device. The power means will complicate the circuits of the controlling device and interfere with the stability of the other circuits in the controlling device.

Secondly, because of the separation of the controlling device from the computer, the controlling device will be combined with the LCD shutter glasses, as shown in FIG. 2(b). It will be inconvenient and uncomfortable to wear the LCD shutter glasses with the extra controlling device. Thirdly, the controlling device of the prior art must receive the horizontal synchronization signal generated by the VGA card in order to lock and detect the positive or negative value of the vertical synchronization signal. The controlling device then requires the said shutter switch means to execute the function of locking and detecting. The requirement of said shutter switch means will complicate the circuit of the controlling device and increase the cost. Fourthly, in order to distinguish the driving signal of the left LCD-type shutter from that of the right LCD-type shutter, it is required to add the output means in the controlling device. The output means comprises an alternate switch to swap the shutter driving signal to the left or right LCD-type shutter of the said LCD shutter glasses. The extra circuit of the output means will also complicate the circuit of the controlling device and increase costs.

In view of the explanation above, an ideal controlling apparatus of LCD shutter glasses should meet the following requirements:

(1) To exclude the power supply circuit, that is, to exclude the said power means in the prior art, in order to avoid the complication of the circuit design and to minimize the interference of the other circuit in the said controlling device.

(2) To separate the said controlling apparatus from the LCD shutter glasses in order to diminish the burden of wearing the LCD shutter glasses.

(3) Only to receive the vertical synchronization signal, not the horizontal synchronization signal, from the VGA card to reduce the complication of the said controlling device and to reduce the cost.

(4) To output the driving signals of the left and the right LCD-type shutters of the said LCD shutter glasses without the help of the said alternate switch swapping the said driving signal to the left or right LCD-type shutter.

SUMMARY OF INVENTION

The present invention relates to an apparatus for controlling liquid-crystal-display (LCD) shutter glasses (hereinafter, a viewing apparatus) and, more particularly, an apparatus capable of alternately making the right and left shutters of the said viewing apparatus transparent. In other words, when the image for the left eye is shown on the screen, the left LCD-type shutter of the said viewing apparatus is transparent and the right LCD-type shutter is opaque. On the other hand, when the image for the right eye is shown on the screen, the right LCD-type shutter is transparent and the left one is opaque. The driving signals of the left and the right LCD-type shutters of the said viewing apparatus are controlled by the vertical synchronization signal generated from the VGA card in a computer. By means of the alternate transparency of the left and right shutters, a truly three-dimensional effect will be produced by the binocular disparity method.

BRIEF DESCRIPTION OF THE APPENDED DRAWINGS

FIG. 1 illustrates the three-dimensional effect of a pair of parallel tracks by the linear perspective method. The terminals of the tracks far away from the observer will be merged together from the view of observer. On the other hand, the distance between the tracks will increase gradually as the tracks are closer to the observer.

FIG. 2(a) illustrates the circuit diagram of the prior art of a controlling device of LCD shutter glasses (U.S. Pat. No. 5,796,373).

FIG. 2(b) illustrates frontal view of said controlling device with the LCD shutter glasses in the prior art (U.S. Pat. No. 5,796,373).

DETAILED DESCRIPTION OF THE INVENTION

Figure 1:
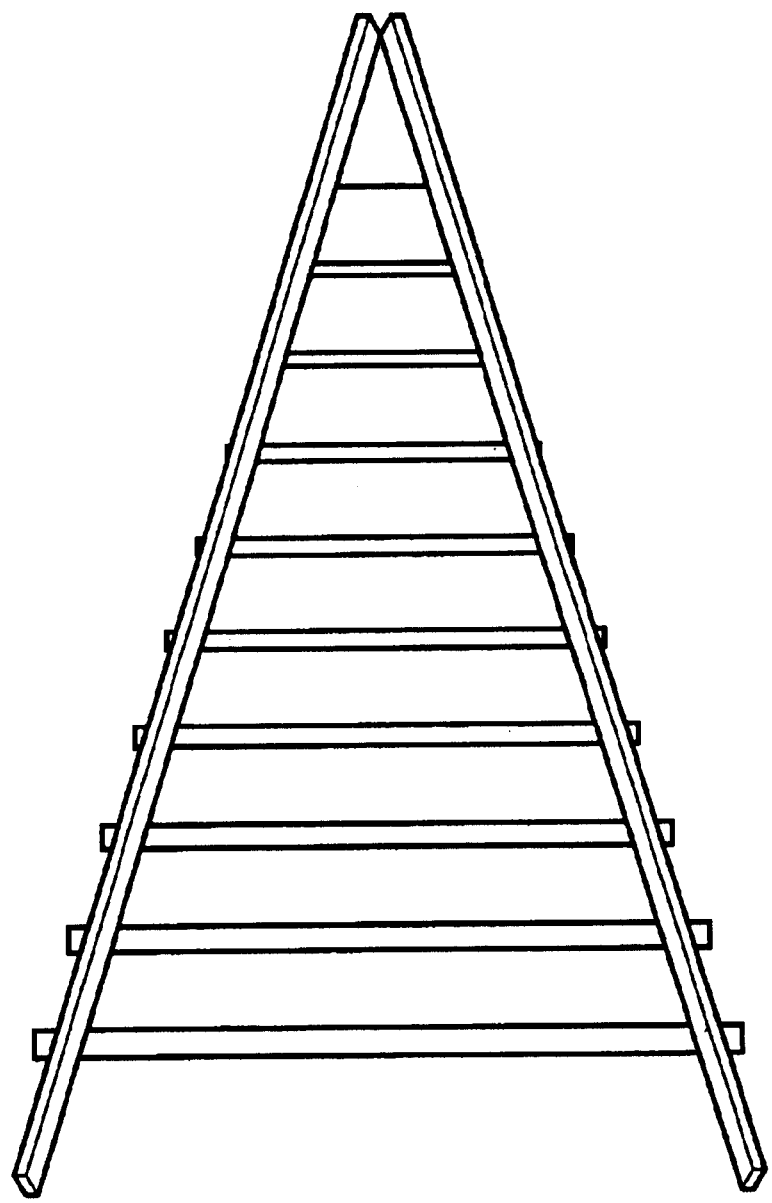
Figure 2A:
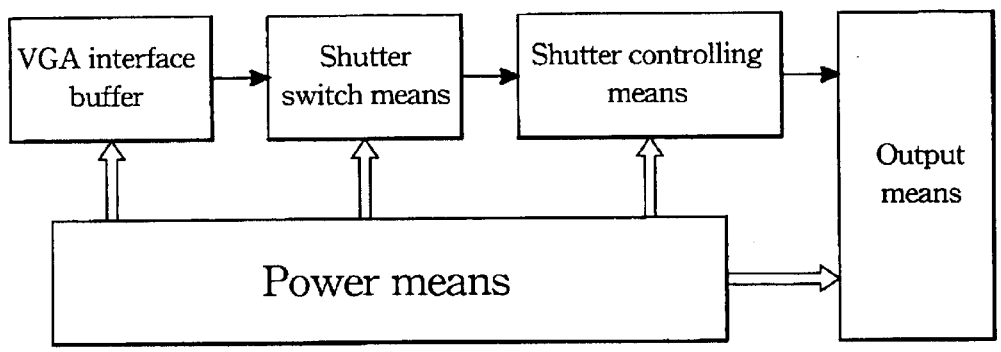
Figure 2B:
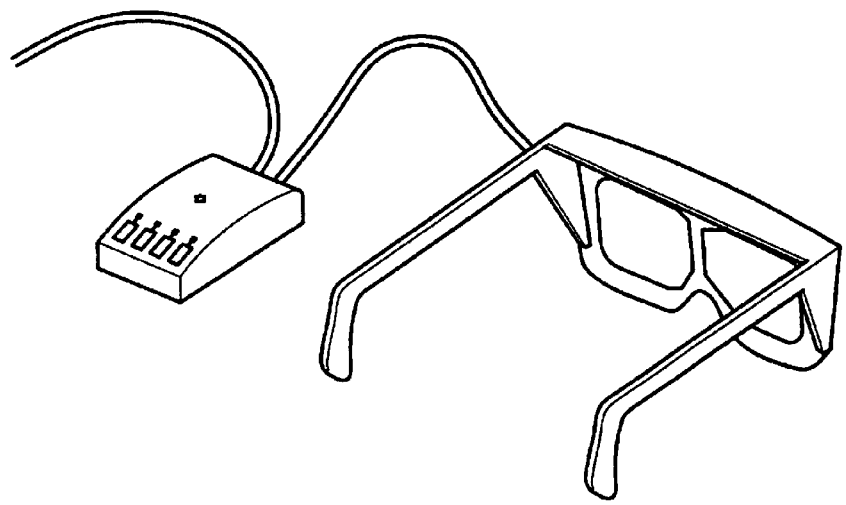
Figure 3:
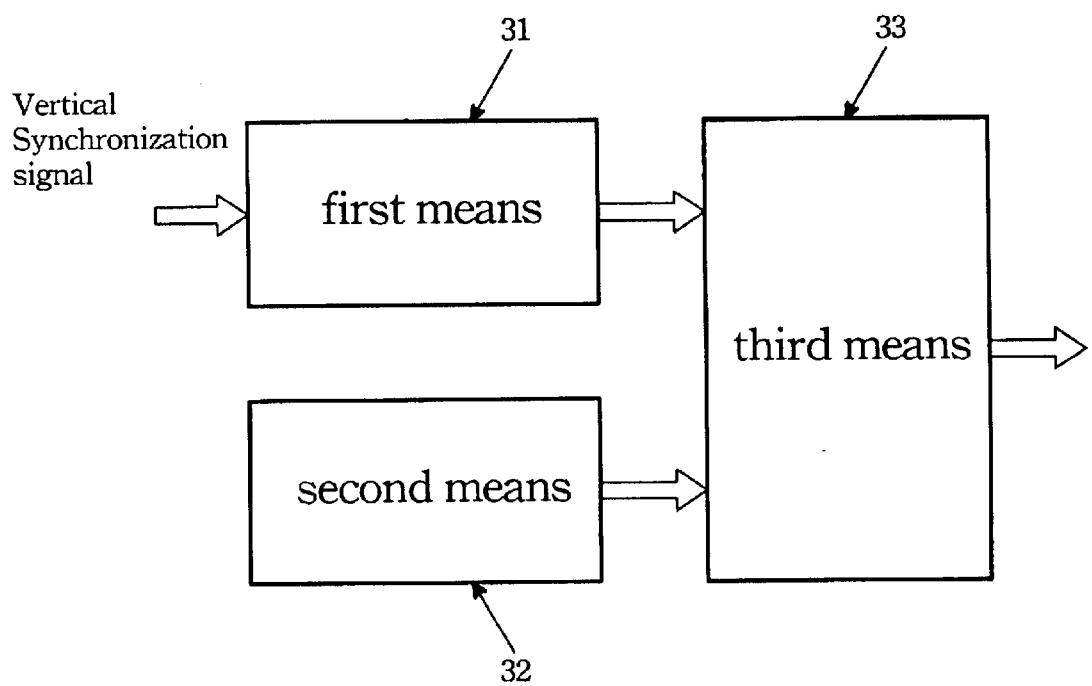
FIG. 3 illustrates the diagram of an apparatus for controlling a viewing apparatus in the present invention.

FIG. 3 illustrates the diagram of an apparatus for controlling a viewing apparatus (that is, LCD shutter glasses). The viewing apparatus includes both right and left LCD-type shutters. An observer could look at an image by wearing the viewing apparatus. Said controlling apparatus comprises of a first means 31, a second means 32 and a third means 33. Said first means 31 receives a vertical synchronization signal from a VGA card in a computer and generates a light-passing enable signal, that is, said first means 31 is responsive to said vertical synchronization signal for generating said light-passing enable signal. Said second means 32 generates a first voltage signal which could make the left or the right LCD-type shutter light-blocking. Said third means 33 is responsive to said light-passing enable signal and said first voltage signal, and then generates a first and a second controlling signals to the left and the right LCD-type shutters. Observers will feel the three-dimensional effect because the left and the said right shutters will be light-passing alternatively.

Figure 4:
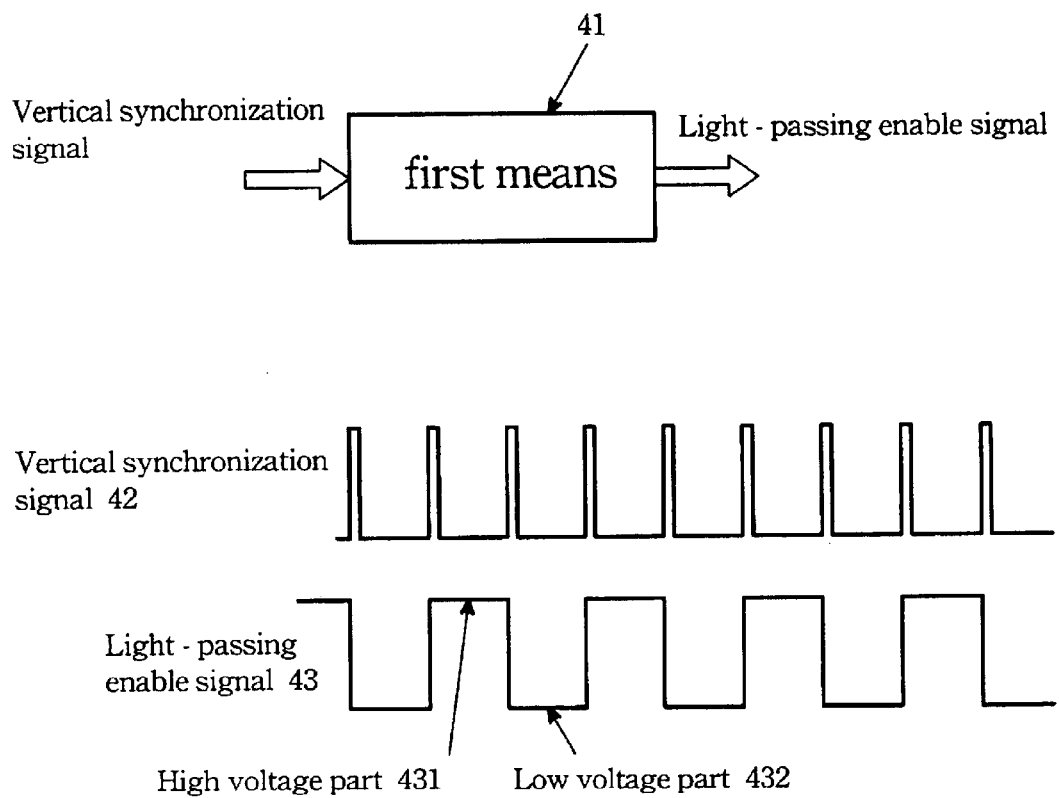
FIG. 4 illustrates the waveform of said vertical synchronization signal inputted to said first means, and the waveform of the light-passing enable signal outputted by said first means.

Said first means 31 could reduce the frequency of the vertical synchronization signal from the VGA card and then generate said light-passing enable signal. The continued time of the high or the low voltage part of the said light-passing enable signal occupies one half of the period of the said light-passing enable signal separately, that is, the duty cycle of the said transparent-enabling signal is 50/50. FIG. 4 illustrates the waveform of said vertical synchronization signal inputted to said first means 31 and the waveform of said light-passing enable signal generated by said first means 31. As shown in FIG. 4, the duty cycle of said light-passing enable signal is 50/50. The high voltage part 431 of said light-passing enable signal 43 could be used for activating the left shutter, and the low voltage part 432 of said light-passing enable signal 43 could be used for activating the right shutter, and vice versa.

Said second means 32 produces said first voltage signal to make the LCD-type shutters of the viewing apparatus opaque. As usual, the LCD-type shutter of the viewing apparatus is transparent if no voltage signal is applied to the LCD-type shutter. On the other hand, the LCD-type shutters are opaque when a voltage signal whose frequency is about 1 KHz is appended to the shutters. Said second means 32 could produce said first voltage signal, whose frequency is about 1 KHz for making the LCD-type shutters light-blocking.

Figure 5:
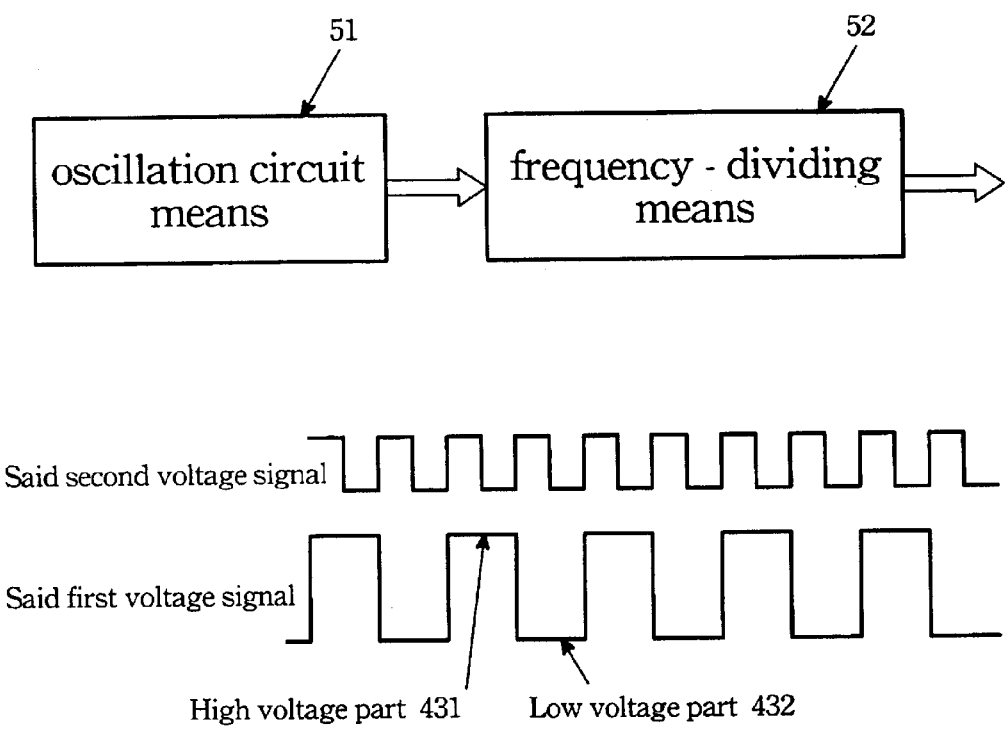
FIG. 5 illustrates the circuit of a second means in the present invention. Said second means comprises of an oscillation-circuit means and a frequency-dividing means.

Another embodiment of said second means 32 comprises an oscillation-circuit means 51 and a frequency-dividing means 52. As shown in FIG. 5, said oscillation-circuit means 51 generates a second voltage signal whose frequency is a multiple of 1 KHz, for example, 2 KHz. Said frequency-dividing means 52 is responsive to said second voltage signal and generates said first voltage signal. The duty cycle of said first voltage signal is also about 50/50, that is, the continued time of the high or the low voltage part of said first voltage signal occupies one half of the period of the said first voltage signal separately.

Figure 6:
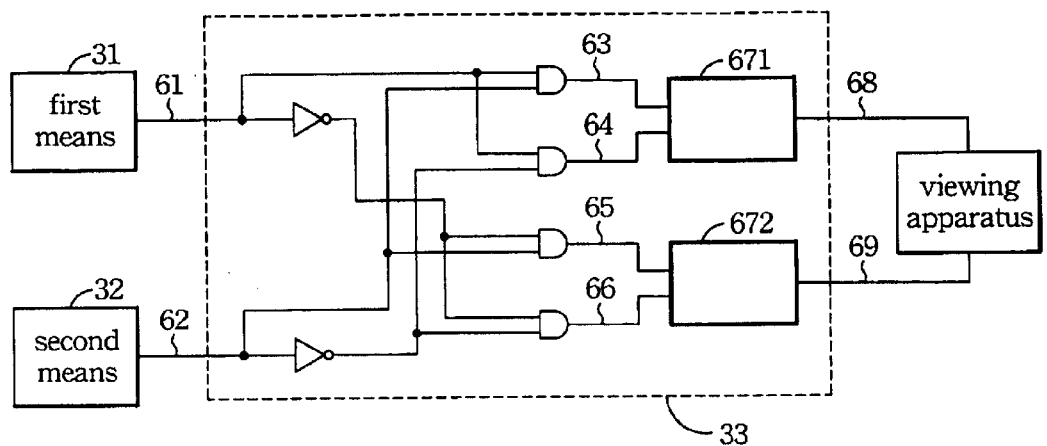
FIG. 6(a) illustrates the circuit of a third means in the present invention.
FIG. 6(b) illustrates the relationship between the input and output signals of said third means.
Figure 6:
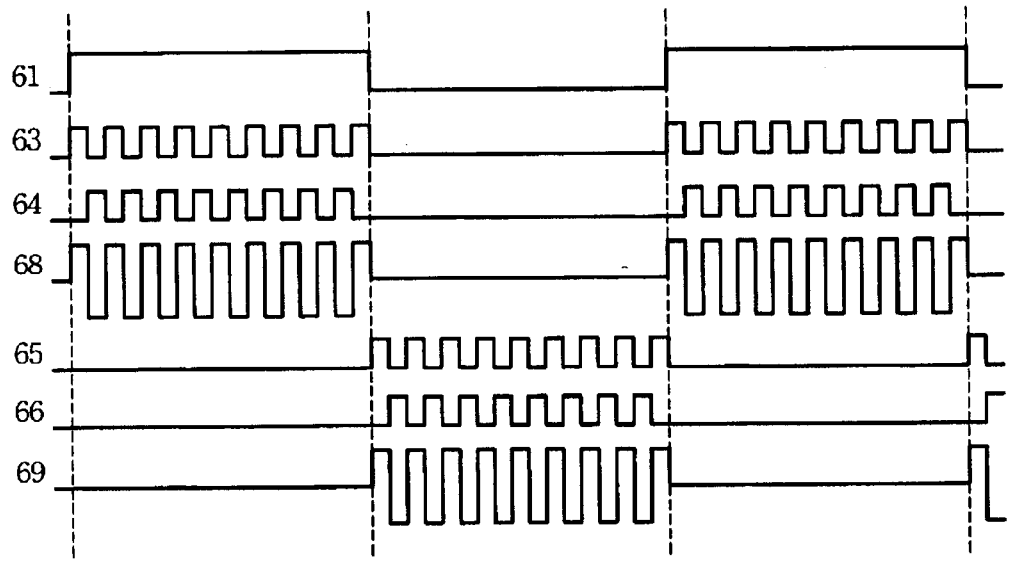

Said third means 33 of the present invention is responsive to said light-passing enable signal and said first voltage signal for generating said first and said second controlling signals to control the left and the right LCD-type shutters. Then, the left and the right LCD-type shutters will be light-passing alternately. The circuit diagram of said third means 33 is illustrated in FIG. 6(a). Wherein a first input signal 61 inputted into said third means 33 is said light-passing enable signal generated by said first means 31 and a second input signal 62 is said first voltage signal generated by said second means 32. After said first input signal 61 and said second input signal 62 are processed by the combination of NOT gates and AND gates, a first temporary signal 63, a second temporary signal 64, a third temporary signal 65 and a fourth temporary signal 66 will be generated (as shown in FIG. 6(b)). Said first temporary signal 63 and said second temporary signal 64 are inputted into a first differential amplifier 671 and then said first controlling signal 68 is generated. Said third temporary signal 65 and said fourth temporary signal 66 are inputted into a second differential amplifier 672 and then said second controlling signal 69 will be generated. Said first controlling signal 68 could make the left LCD-type shutter of the viewing apparatus transparent or opaque alternately; so could said second controlling signal make the right LCD-type shutter of the viewing apparatus transparent or opaque alternately.

When the image for the left eye is shown on the computer screen, the left LCD-type shutter of the said view apparatus is light-passing and meanwhile the right LCD-type shutter is light-blocking. At another time when the image for the right eye is shown on the screen, the right LCD-type shutter is transparent and the left shutter is light-blocking. By means of the alternate transparency of the left and right shutters, a truly three-dimensional effect will be produced by the binocular disparity method.

As mentioned above, the present invention could make the left and right shutters of the viewing apparatus light-passing alternately such that the alternately transparent speed of the left and right shutters is matched with the vertical synchronization signal of a VGA card. A three-dimensional effect is observed by an observer who wears said viewing apparatus dominated. Furthermore, the present invention does not require the power supply circuit and not have to receive the horizontal synchronization signal from the VGA card, so the circuit of the present invention is simple and the cost is lower than the prior art.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

What is claimed is:

1. An apparatus for controlling a viewing apparatus, said viewing apparatus including a right and a left LCD-type shutter and for presenting an image to an observer wearing said viewing apparatus, comprising:

a first means, responsive to only a vertical synchronization signal, for generating a light-passing enable signal;

a second means for generating a first voltage signal, where said second means includes an oscillation-circuit means for generating a second voltage signal, and a frequency-dividing means, responsive to said second voltage signal, for generating said first voltage signal; and a third means, responsive to said light-passing enable signal and said first voltage signal, for generating a first and a second controlling signal to control the left and the right LCD-type shutters such that a three-dimensional image effect is created.

2. An apparatus for controlling a viewing apparatus in claim 1, wherein said first means reduces the frequency of said vertical synchronization signal to generate said light-passing enable signal.

3. An apparatus for controlling a viewing apparatus, said viewing apparatus including a right and a left LCD-type shutter for presenting an image to an observer wearing said viewing apparatus, comprising:

a first means, responsive to a vertical synchronization signal, for generating a light-passing enable signal;

a second means for generating a first voltage signal, where said second means includes an oscillation-circuit means for generating a second voltage signal, and a frequency-dividing means, responsive to said second voltage signal, for generating said first voltage signal; and a third means, responsive to said light-passing enable signal and said first voltage signal, for generating a first and a second controlling signal to control the left and the right LCD-type shutters such that a three-dimensional image effect is created.

4. An apparatus for controlling a viewing apparatus in claim 3, wherein said first means reduces the frequency of said vertical synchronization signal to generate said light-passing enable signal.

* * * * *